United States Patent
Chang et al.

(10) Patent No.: US 9,372,295 B2
(45) Date of Patent: Jun. 21, 2016

(54) LIQUID CRYSTAL FILM

(75) Inventors: Jun Won Chang, Daejeon (KR); Moon Soo Park, Daejeon (KR); Dae Hee Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 13/474,384

(22) Filed: May 17, 2012

(65) Prior Publication Data

US 2012/0224126 A1 Sep. 6, 2012

Related U.S. Application Data

(63) Continuation of application No. PCT/KR2011/008590, filed on Nov. 10, 2011.

(30) Foreign Application Priority Data

| Nov. 10, 2010 | (KR) | 10-2010-0111752 |
| Nov. 10, 2010 | (KR) | 10-2010-0111753 |
| Nov. 10, 2011 | (KR) | 10-2011-0117224 |

(51) Int. Cl.
*G02F 1/1335* (2006.01)
*G02B 5/30* (2006.01)
*C09K 19/04* (2006.01)

(52) U.S. Cl.
CPC ............ *G02B 5/3025* (2013.01); *G02B 5/3016* (2013.01); *G02F 1/13362* (2013.01); *C09K 2019/0448* (2013.01); *C09K 2219/03* (2013.01); *G02F 2201/343* (2013.01); *Y10T 428/10* (2015.01); *Y10T 428/1041* (2015.01); *Y10T 428/31504* (2015.04)

(58) Field of Classification Search
CPC G02F 1/13362; G02B 5/3016; G02B 5/3025; C09K 2019/0448; C09K 2219/03; Y10T 428/10; Y10T 428/1041; Y10T 428/31504
See application file for complete search history.

(56) References Cited

U.S. PATENT DOCUMENTS

| 6,124,905 A * | 9/2000 | Iijima | 349/62 |
| 2004/0070710 A1* | 4/2004 | Yoshii | 349/113 |
| 2008/0186418 A1* | 8/2008 | Kim et al. | 349/96 |
| 2010/0201921 A1* | 8/2010 | Bell | 349/77 |
| 2010/0225857 A1* | 9/2010 | Lu et al. | 349/98 |
| 2010/0231830 A1* | 9/2010 | Hirakata et al. | 349/85 |
| 2010/0321609 A1* | 12/2010 | Qi et al. | 349/62 |
| 2012/0081635 A1* | 4/2012 | Fukuda et al. | 349/64 |
| 2012/0320306 A1* | 12/2012 | Lee | G02B 5/3016 349/61 |

FOREIGN PATENT DOCUMENTS

| CN | 1283276 A | | 2/2001 |
| CN | 101432645 A | | 5/2009 |
| JP | 11-194217 A | | 7/1999 |
| JP | 2002-14229 A | | 1/2002 |
| JP | 2005-106945 A | | 4/2005 |
| JP | 2007-148158 A | | 6/2007 |
| KR | 10-2001-0033458 | * | 4/2001 |
| KR | 10-2007-0069512 | * | 4/2010 |
| KR | 10-2010-0047571 | * | 5/2010 |
| TW | 356530 | | 4/1999 |
| WO | 2005/026830 A1 | | 3/2005 |

* cited by examiner

*Primary Examiner* — Ryan Crockett
(74) *Attorney, Agent, or Firm* — Dentons US LLP

(57) ABSTRACT

A liquid crystal film (LCF) is provided. The exemplified LCF can be used as a reflective polarization plate, which can improve luminance and light utilization efficiency of a display device, such as an LCD, and the like.

12 Claims, 7 Drawing Sheets

LIQUID CRYSTAL FILM

CROSS-REFERENCE TO RELATED APPLICATION

This application is a continuation application (bypass application), under 35 USC §120, of International Patent Application No. PCT/KR2011/008590, filed on Nov. 10, 2011, which claims priority to and the benefit of Korean Patent Application Nos. 10-2010-0111753, filed Nov. 10, 2010, 10-2010-0111752, filed Nov. 10, 2010, and 10-2011-117224, filed Nov. 10, 2011, which are incorporated by reference in their entirety herein.

BACKGROUND

1. Field of the Invention

The present invention relates to a liquid crystal film, a method of manufacturing the same, an optical device, and an LCD.

2. Discussion of Related Art

A liquid crystal display (LCD) may include a liquid crystal panel, and polarization plates disposed on the upper and lower sides of the liquid crystal panel, and may include various functional optical devices in addition to the polarization plates.

An LCD can display an image by changing an alignment of liquid crystal molecules in each pixel of the liquid crystal panel. Since an LCD is not a self-emissive device, a light source, such as a backlight unit (BLU), and the like, is generally disposed on the rear surface of a polarization plate disposed on the lower side of the liquid crystal panel, and an image is displayed by penetrating light emitted from the light source through the panel.

SUMMARY OF THE INVENTION

The present invention is directed to providing a liquid crystal film (LCF), a method of manufacturing the same, an optical device, and an LCD.

The present invention relates to a LCF. An exemplified LCF includes a liquid crystal layer including a cholesteric-aligned liquid crystal area (hereinafter referred to as a "CLC layer"). The CLC layer in the specification may be a single layer. For the present specification, when the CLC layer is referred to as a single layer, the CLC layer being formed by stacking or adhering at least two CLC layers or the CLC layer being formed by coating a CLC composition multiple times may be excluded.

The liquid crystal area may include at least two types of liquid crystal areas, of which center wavelengths of reflected light are different from each other.

In addition, a haze value of the LCF may be at least 5%. In an example, a haze value of the LCF may be at least 10% or at least 15%.

The haze value may be selected to create a most proper effect according to the use to which the LCF is applied. For example, when the LCF includes a reflective polarization plate to be described below, the LCF allows incident light to scatter and/or diffuse properly so that a device can exhibit an excellent luminance property with a haze value within the above-mentioned range. In addition, the LCF can effectively reproduce a color coordinate of the light source with a haze value within the above-mentioned range. The haze value of the LCF may be measured according to a manufacturer's manual using a hazemeter, such as HR-100, HM-150, and the like, available from Sepung, for example.

An upper limit of the haze value of the LCF is not specifically limited, but for example, may be about 30%, 25%, or 20%.

The haze value of the LCF may be controlled, for example, by controlling an alignment state of a cholesteric-aligned liquid crystal area in the CLC layer or including a haze layer at a proper location of the film, as will be described below, but is not limited thereto. The term "haze layer" may include all of the known layers that can give a proper haze value to the LCF The CLC layer includes the cholesteric-aligned liquid crystal area. For the present specification, the cholesteric liquid crystal or cholesteric-aligned liquid crystal may be abbreviated to "CLC." Referring to FIG. 1, the CLC has a helical structure, in which a director (n in FIG. 1) of a liquid crystal molecule is twisted along a helical axis (X in FIG. 1) and the liquid crystal molecules are aligned and form a layer. In the CLC structure, the distance to complete a 360-degree revolution by the director of the liquid crystal molecule (P in FIG. 1) is called a "pitch." For the present specification, the term, "liquid crystal area or CLC area" may mean a CLC area to complete a 360-degree revolution by the director of the CLC. Each CLC area in the present specification may be classified, for example, according to the center wavelength of reflected light of each CLC area.

The CLC may selectively reflect light of circularly polarized light. The wavelength of light reflected by the CLC depends on a pitch and a refractive index of the liquid crystal. A helical twist of the CLC director allows a periodic deformation spatially in a dielectric tensor of a material, thereby selectively reflecting the wavelength of light. Generally, Bragg reflection occurs in light propagated along a helical axis for the CLC when a wavelength $\lambda$ is within the range of the following Formula 1:

$$N_o P < \lambda < N_e P \quad \text{[Formula 1]}$$

where, P is a pitch of the CLC area; $N_e$ is a refractive index of the CLC to light polarized parallel to the director of the CLC; and $N_o$ is a refractive index of the CLC to light polarized vertically to the director of the CLC.

In addition, a center wavelength $\lambda_0$ of the wavelength range of light reflected by the CLC, i.e., reflected light, may be approximated by the following Formula 2:

$$\lambda_0 = 0.5(N_o + N_e)P \quad \text{[Formula 2]}$$

where, P, $N_e$ and $N_o$ are as defined in Formula 1.

In addition, a spectral width $\Delta\lambda_0$ of light reflected by the CLC may be approximated by the following Formula 3:

$$\Delta\lambda_0 = 2\lambda_0(N_e - N_o)/(N_o + N_e) = P(N_e - N_o) \quad \text{[Formula 3]}$$

where, P, $N_e$ and $N_o$ are as defined in Formula 1.

The CLC layer includes at least two types of CLC areas. For at least two CLC areas, the center wavelengths of reflectible light, i.e., the reflected light, are different from each other.

In an example, the CLC areas with different center wavelengths of the reflected light from each other may have pitches in different ranges from each other. Therefore, in an example, when the CLC layer of the single layer includes at least two types of CLC areas, the CLC layer is thin, but it can use the wide wavelength range of a selective reflecting property by the CLC layer. For the present specification, the CLC layer that is a single layer and also includes at least two types of the CLC areas may be called a wideband CLC layer.

For the CLC layer, the arrangements of the CLC areas that have the different center wavelengths of the reflected light from each other are not particularly limited. In an example, the CLC areas may be arranged so that the center wavelength of the reflected light of each area becomes successively longer or shorter, arranged so that the center wavelength becomes longer and then shorter, arranged so that the center wavelength becomes shorter and then longer, or arranged so that the center wavelength is irregularly changed, from one side to other side of the CLC layer. In an example, when the CLC included in the CLC layer are the same type of composition, the pitch of the CLC area may be changed to exhibit the center wavelength of the reflected light as mentioned above.

In an exemplified CLC layer, the CLC area, of which the center wavelength of the reflected light belongs to a red-light area of the visible spectrum, may be arranged on one main surface of the CLC layer and the CLC area, of which the center wavelength of the reflected light belongs to a blue-light area, may be arranged on another main surface of the CLC layer, in which the areas may be arranged so that the center wavelength of the reflected light of each CLC area may be successively changed along a thickness direction of the CLC layer.

The term, "a thickness direction of the CLC layer" in the present specification may mean a direction parallel to a hypothetical line that connects one main surface of the CLC layer and the opposing main surface thereof in the shortest distance. In an example, when the LCF further includes a substrate and the CLC layer is formed on one side of the substrate to be described below, the thickness direction of the CLC layer may be a direction parallel to a hypothetical line that is formed in a perpendicular direction to a side of the substrate that has the CLC layer. For an angle definition in the present specification, when terms such as verticality, horizontality, orthogonality, or parallel are used, they refer to verticality, horizontality, orthogonality, or parallel within a range that does not damage the desired effects. For example, they include errors that consider manufacturing error, variation, and the like. For example, each case may include an error of less than about ±15°, an error of less than about ±10°, or an error of less than about ±5°.

FIG. 2 is a schematic diagram showing a CLC layer 2 in the abstract, illustrating the example of successively arranging a CLC area 231, of which the center wavelength of the reflected light belongs to a red-light area, a CLC area 232, of which the center wavelength of the reflected light belongs to a green-light area, and a CLC area 233, of which the center wavelength of the reflected light belongs to a blue-light area, in the direction from one main surface 21 side to another main surface 22 side of the CLC layer 2.

In an example, the CLC layer may include at least a first area in which the center wavelength of the reflected light is 400 nm to 500 nm, a second area in which the center wavelength of the reflected light is 500 nm to 600 nm, and a third area in which the center wavelength of the reflected light is 600 nm to 700 nm. In an example, the first to third areas may be arranged to change the center wavelength of the reflected light of each area successively along the thickness direction of the CLC layer, but are not limited thereto. The center wavelength of the reflected light of the CLC area may be measured using a process that is known in the related art.

In an example, the CLC layer may include a CLC area that is formed so that the helical axis of the director of the liquid crystal molecule is not parallel to the thickness direction of the CLC layer. For example, the CLC layer may include a CLC area, of which the helical axis is formed to be parallel to the thickness direction, and a CLC area, of which the helical axis is formed not to be parallel to the thickness direction.

Referring to FIG. 3, the arrangement of the helical axis of the CLC area is illustrated by example as follows.

Generally, the CLC area includes the CLC molecule rotating helically, but is arranged so that the director of the CLC molecule, for example, the helical axis of the major axis of the CLC molecule is parallel to the thickness direction of the CLC layer. In this general case, the CLC area is aligned so that a helical axis HA of the CLC is parallel to a thickness direction 31 of the CLC layer as shown in A of FIG. 3. In FIG. 3, a direction 32 perpendicular to the thickness direction 31 may mean, for example, a plane direction of the substrate as indicated above. For the present specification, the CLC area, in which the helical axis is aligned in a parallel state to the thickness direction of the CLC layer as indicated above, may be called a planar-aligned CLC area.

According to an alignment condition of the CLC, or the property the plane of the substrate to form the CLC, the helical axis of the director of the CLC molecule may be arranged in a direction not parallel to the thickness direction of the CLC layer. For example, the alignment may be performed such that the helical axis HA of the CLC is aligned in a direction perpendicular to the thickness direction 31 of the CLC layer as shown in B of FIG. 3 and the helical axis HA of the CLC is aligned in a direction other than directions perpendicular and parallel to the thickness direction 31 of the CLC layer as shown in C of FIG. 3. For the present specification, the CLC area, of which the helical axis is aligned perpendicularly to the thickness direction of the CLC layer, may be called a homeotropic-aligned CLC area and the CLC area, of which the helical axis is aligned in a direction other than the directions perpendicular and parallel to the thickness direction of the CLC layer, may be called a focal conic-aligned CLC area.

The CLC area in the CLC layer formed in a general way is aligned so that the helical axis is parallel to the thickness direction of the CLC layer. However, the CLC layer of the LCF may include the CLC area, of which the helical axis is artificially formed in a direction other than the direction parallel to the thickness direction of the CLC layer. The CLC area, of which the helical axis is formed in a direction other than the direction parallel to the thickness direction of the CLC layer, may control a haze property of the LCF.

An amount, a location, and a distribution state of the homeotropic- or focal conic-aligned CLC area in the CLC layer are not specifically limited, nor is the angle of the helical axis limited to the thickness direction in the focal conic-alignment, etc. In an example, the homeotropic- or focal conic-aligned CLC area may be formed and arranged so that the LCF can have the haze range of the above-mentioned range.

The homeotropic- or focal conic-aligned CLC area may be formed by controlling, for example, the surface property of the side having the CLC layer or properly setting the alignment condition of the CLC, as will be described below.

In an example, the CLC layer may include a liquid crystal polymer. An exemplified method of manufacturing the CLC layer may include coating a composition including a polymeric liquid crystal compound, and a polymeric or non-polymeric chiral agent, and polymerizing the composition in a state inducing a helical pitch of the liquid crystal compound by the chiral agent, and in this case, the CLC layer may include a polymerized liquid crystal polymer.

One exemplified CLC layer may include a compound represented by the following Chemical Formula 1 in a polymerized form:

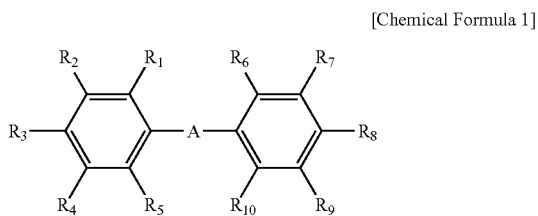

[Chemical Formula 1]

where, A is a single bond, —COO—, or —OCO—; and
$R_1$ to $R_{10}$ are independently hydrogen, a halogen, an alkyl group, an alkoxy group, a cyano group, a nitro group, —O-Q-P, or a substituent of the following Chemical Formula 2, respectively, with the proviso that at least one of $R_1$ to $R_{10}$ is —O-Q-P or a substituent of the following Chemical Formula 2, where Q is an alkylene group or an alkylidene group, and P is an alkenyl group, an epoxy group, a cyano group, a carboxyl group, an acryloyl group, a methacryloyl group, an acryloyloxy group, or a methacryloyloxy group.

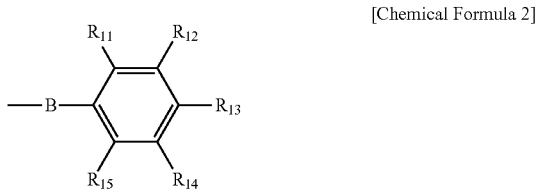

[Chemical Formula 2]

where, B is a single bond, —COO—, or —OCO—; and
$R_{11}$ to $R_{15}$ are independently hydrogen, a halogen, an alkyl group, an alkoxy group, a cyano group, a nitro group, or —O-Q-P, respectively, with the proviso that at least one of $R_{11}$ to $R_{15}$ is —O-Q-P, where Q is an alkylene group or an alkylidene group, and P is an alkenyl group, an epoxy group, a cyano group, a carboxyl group, an acryloyl group, a methacryloyl group, an acryloyloxy group, or a methacryloyloxy group.

The left side "—" of B in Chemical Formula 2 means that B directly binds to benzene of Chemical Formula 1.

The term "a single bond" in Chemical Formula 1 and Chemical Formula 2 means that there is no special atom at the part marked with A or B. For example, when A of Chemical Formula 1 is a single bond, benzenes of both sides of A may be directly bound to form a biphenyl structure.

In Chemical Formula 1 and Chemical Formula 2, the halogen may be, for example, chlorine, bromine, or iodine.

In Chemical Formula 1 and Chemical Formula 2, the alkyl group may be, for example, $C_1$ to $C_{20}$, $C_1$ to $C_{16}$, $C_1$ to $C_{12}$, $C_1$ to $C_8$, or $C_1$ to $C_4$ straight or branched chain alkyl groups, or $C_3$ to $C_{20}$, $C_3$ to $C_{16}$, or $C_4$ to $C_{12}$ cycloalkyl groups. In addition, the alkyl group may be randomly substituted with at least one substituent.

In Chemical Formula 1 and Chemical Formula 2, the alkoxy group may be, for example, $C_1$ to $C_{20}$, $C_1$ to $C_{16}$, $C_1$ to $C_{12}$, $C_1$ to $C_8$, or $C_1$ to $C_4$ alkoxy groups. The alkoxy group may have a straight chain, branched chain, or circular structure. In addition, the alkoxy group may be randomly substituted with at least one substituent.

In addition, in Chemical Formula 1 and Chemical Formula 2, the alkylene group or alkylidene group may be, for example, $C_1$ to $C_{12}$, $C_4$ to $C_{10}$, or $C_6$ to $C_9$ alkylene groups or alkylidene groups. The alkylene group or alkylidene group may have a straight chain, branched chain, or circular structure. In addition, the alkylene group or alkylidene group may be randomly substituted with at least one substituent.

In addition, in Chemical Formula 1 and Chemical Formula 2, the alkenyl group may be, for example, $C_2$ to $C_{20}$, $C_2$ to $C_{16}$, $C_2$ to $C_{12}$, $C_2$ to $C_8$, or $C_2$ to $C_4$ alkenyl groups. The alkenyl group may have a straight chain, branched chain, or circular structure. In addition, the alkenyl group may be randomly substituted with at least one substituent.

The substituent for the alkyl group, the alkoxy group, the alkenyl group, the alkylene group, or the alkylidene group may be, for example, an alkyl group, an alkoxy group, an alkenyl group, an epoxy group, a cyano group, a carboxyl group, an acryloyl group, a methacryloyl group, an acryloyloxy group, a methacryloyloxy group, an aryl group, and the like, but is not limited thereto.

In addition, in Chemical Formula 1 and Chemical Formula 2, P may be preferably an acryloyl group, a methacryloyl group, an acryloyloxy group, or a methacryloyloxy group; more preferably, an acryloyloxy group or a methacryloyloxy group; and most preferably, an acryloyloxy group.

In Chemical Formula 1 and Chemical Formula 2, —O-Q-P or a residue of Chemical Formula 2, of which at least one may be presented, may be presented at the site of $R_3$, $R_8$, or $R_{13}$, and for example, may be one or two. In addition, a substituent other than —O-Q-P or a residue of Chemical Formula 2 in a compound of Chemical Formula 1 or the residue of Chemical Formula 2 may be, for example, hydrogen, a halogen, a $C_1$ to $C_4$ straight chain or branched chain alkyl group, a $C_4$ to $C_{12}$ cycloalkyl group, a cyano group, a $C_1$ to $C_4$ alkoxy group, a cyano group, or a nitro group, and preferably, chlorine, a $C_1$ to $C_4$ straight chain or branched chain alkyl group, a $C_4$ to $C_{12}$ cycloalkyl group, a $C_1$ to $C_4$ alkoxy group, or a cyano group.

When the chiral agent that can be included in the CLC layer does not damage liquid-crystallinity, for example, nematicity, and induces a desired helical pitch, it may be used without particular limitation. The chiral agent for inducing the helical pitch in the liquid crystal needs to include at least chirality in the molecular structure. The chiral agent may be, for example, a compound having one or two or more asymmetric carbons, a compound with an asymmetric point on a hetero atom, such as, chiral amine, chiral sulfoxide, and the like, or a compound with an axially asymmetric, optically active site having axial asymmetry, such as cumulene, binaphthol, and the like. The chiral agent may be, for example, a low molecular compound with a molecular weight of 1,500 or less. For example, the chiral agent may include a commercial chiral nematic liquid crystal, for example, Chiral Dopant Liquid Crystal S-811 available from Merck, LC756 available from BASF, and the like.

The CLC layer may have, for example, a thickness of 3 μm to 8 μm or 4 μm to 6 μm. The thickness of the CLC layer is controlled to be in the above-mentioned range to effectively implement a wideband CLC layer and the homeotropic- or focal conic-aligned CLC area may be effectively formed according to necessity.

The LCF may further include a haze layer that is formed on one side or both sides of the CLC layer. The haze layer may be formed to be in direct contact with the CLC layer or may be formed on another constituent that is formed on the CLC layer.

In an example, the haze layer may be a resin layer including a particle. The particle may have a different refractive index from that of the resin layer. The resin layer including the particle with a different refractive index may control the haze value of the LCF by scattering and/or diffusing incident light.

In an example, the resin layer may include a room temperature curable composition, a moisture curable composition, a heat curable composition, an active energy ray curable composition, or a hybrid curable composition in a state of curing. The term, "a state of curing" may refer to the state after crosslinking or polymerization of the components that are included in the composition. In addition, for the room temperature curable composition, the moisture curable composition, the heat curable composition, the active energy ray curable composition, or the hybrid curable composition, the state of curing thereof may be induced at room temperature, in the presence of humidity, or by irradiating heat or active energy rays, or may refer to the composition cured through operating at least two mechanisms thereof, simultaneously or sequentially. In addition, the active energy rays may be, for example, electromagnetic waves, such as ultraviolet rays, electron rays, and the like.

The composition may include an acrylic compound, an epoxy compound, a urethane compound, a phenol compound, a polyester compound, and the like. The "compound" may be a monomeric, oligomeric, or polymeric compound.

In an example, the resin layer may include an acrylic composition with a resistance to a yellowing, and the like, and an excellent optical property, such as transparency, and preferably, may include the active energy ray curable acrylic composition in a state of curing.

The active energy ray curable acrylic composition may include, for example, an active energy ray polymeric polymer component and a reactive diluent monomer.

The polymer component may be, for example, a component that is known as a photopolymerizable oligomer in the related art, such as urethane acrylate, epoxy acrylate, ether acrylate, ester acrylate, and the like, or a polymer of a mixture including a monomer, such as a (meth)acrylic acid ester monomer. The (meth)acrylic acid ester monomer may be, for example, alkyl (meth)acrylate, (meth)acrylate having an aromatic group, heterocyclic (meth)acrylate, alkoxy (meth)acrylate, and the like. There are known various polymer components for preparing the active energy ray curable composition in the related art, and the above-mentioned compounds may be selected according to necessity.

The reactive diluent monomer that can be included in the active energy ray curable acrylic composition may be, for example, an active energy ray curable functional group, for example, a monomer having at least one or two of an acryloyl group, a methacryloyl group, and the like, and for example, the (meth)acrylic ester monomer, multifunctional acrylate, and the like may be used.

A selection of the components and a mixing ratio of the selected components for preparing the active energy ray curable acrylic composition are not particularly limited, and may be controlled considering a desired hardness and other properties of the resin layer.

In an example, the particle included in the resin layer may have a different refractive index from the resin layer. For example, a difference of refractive index between the particle and the resin layer may be 0.03 or less, or 0.02 to 0.2. When the difference of refractive index is excessively small, it is difficult to induce haze, and conversely, when it is excessively great, there are disadvantages in that the scattering is excessively generated in the resin layer, thereby increasing the haze, but decreasing light transmission and contrast properties, and the like, and thus a proper particle should be selected considering the above factors.

The shape of the particle included in the resin layer is not particularly limited, but may be, for example, a globular shape, an oval shape, a polyhedral shape, an amorphous shape, or other shapes. The particle may have an average diameter of 50 nm to 5,000 nm. In an example, particle with concavo-convex shape on its surface may also be used as the particle. For the particle, the mean surface roughness (Rz) may be 10 nm to 50 nm or 20 nm to 40 nm, and/or the maximum heights of the concavo-convex shape formed on the surface may be about 100 nm to 500 nm or 200 nm to 400 nm, and the width between the concavo-convex shape may be 400 nm to 1,200 nm or 600 nm to 1,000 nm. The particle has an excellent compatibility with the resin layer and excellent dispersion properties therein.

Various inorganic or organic particles may be exemplified as the particle. Examples of the inorganic particles may be, for example, silica, amorphous titania, amorphous zirconia, indium oxide, alumina, amorphous zinc oxide, amorphous cerium oxide, barium oxide, calcium carbonate, amorphous barium titanate, barium sulfate, and the like, and examples of the organic particles may be, for example, a cross-linking or non-crosslinking material of the organic-based material, such as an acrylic resin, a styrene resin, a urethane resin, a melamine resin, a benzoguanamine resin, an epoxy resin, a silicon resin, and the like, but are not limited thereto.

The content of the particle in the resin layer is not particularly limited. For example, the content of the particle may be determined within a range that exhibits the above-mentioned haze values in the LCF.

The resin layer may further include an additional agent, such as a polymerization initiator, an ultraviolet blocking agent, an absorbent, an anti-static agent, a dispersing agent, and the like, according to necessity.

In an example, the LCF may further include a substrate and the CLC layer may be formed on at least one side of the substrate. In an example, when the LCF further includes the substrate and the CLC layer is formed on one side of the substrate, for the CLC layer, the CLC area whose center wavelength of the reflected light belongs to the red-light area of the visible spectrum is arranged on one main surface and the CLC area whose center wavelength of the reflected light belongs to the blue-light area of the visible spectrum is arranged on another main surface. At this point, when the CLC areas are arranged to successively change the center wavelength of the reflected light of each CLC area along the thickness direction of the CLC layer, the main surface of the CLC layer adhered to the substrate may have the CLC area whose center wavelength of the reflected light belongs to the red-light area, or the CLC area whose center wavelength of the reflected light belongs to the blue-light area. In other example, the main surface of the CLC layer adhered to the substrate may have the CLC area whose center wavelength of the reflected light belongs to the red-light area.

FIG. 4 is a cross-sectional diagram showing an exemplified LCF 4, in which the above-mentioned CLC layer 41 is formed on one main surface of a substrate 42.

In an example, the side of the substrate that has the CLC layer may be hydrophilic in order to form the homeotropic- or focal conic-aligned CLC areas. In an example, the side of the substrate that has the CLC layer may have a wetting angle to water of about 0° to 50°, 0° to 40°, 0° to 30°, 0° to 20°, 0° to 10°, 10° to 50°, 20° to 50°, or 30° to 50°. When the CLC layer is formed on the side of the substrate having the wetting angle of the above-mentioned range, the homeotropic- or focal conic-aligned CLC areas may be properly formed. A method of measuring the wetting angle of the substrate to water may include a method of measuring the wetting angle that is known in the related art, but is not limited thereto. For example, it may be measured using a DSA100 instrument available from KRUSS according to a manufacturer's manual.

In order for the substrate to have the wetting angle within the above-mentioned range, a hydrophilic treatment may be performed on the side of the substrate, or the substrate containing a hydrophilic functional group may be used as the substrate. There are various hydrophilic treatment methods of controlling the wetting angle of the substrate to be within the above-mentioned range and various substrates having the wetting angle within the above-mentioned range in the related art. The hydrophilic treatment may be, for example, a corona treatment, a plasma treatment, an alkaline treatment, and the like. Therefore, in an example, the side of the substrate may have a corona treating layer, a plasma treating layer, or an alkaline treating layer.

Various types of substrates may be used as the substrate. In one example, the substrate may be an optically isotropic substrate, an optically anisotropic substrate, such as a retardation layer, and the like, a polarization element, and the like.

The optically isotropic substrate may be a transparent substrate, such as a glass substrate, a transparent plastic substrate, and the like. The plastic substrate may be, for example, a cellulose substrate, such as a diacetyl cellulose (DAC) or triacetyl cellulose (TAC) substrate; a cyclo olefin copolymer (COP) substrate, such as a norbornene derivative resin substrate, and the like; an acrylic substrate, such as a poly(methyl methacrylate) (PMMA) substrate, and the like; a polycarbonate (PC) substrate; an olefin substrate, such as a polyethylene (PE) or polypropylene (PP) substrate, and the like; a polyvinyl alcohol (PVA) substrate; a poly ether sulfone (PES) substrate; a polyetheretherketone (PEEK) substrate; a polyetherimide (PEI) substrate; a polyethylenenaphthatlate (PEN) substrate; a polyester substrate, such as a polyethyleneterephtalate (PET) substrate, and the like; a polyimide (PI) substrate; a polysulfone (PSF) substrate; a polyarylate (PAR) substrate, a fluororesin substrate, and the like. The substrate may be, for example, a sheet or film.

The optically anisotropic substrate, for example, the retardation layer, may be, for example, a λ/4 wavelength layer, a λ/2 wavelength layer, and the like. The term, "λ/4 wavelength layer" in the present specification may refer to an optical device that allows incident light to retardate down to ¼ of the wavelength and the term, "λ/2 wavelength layer" in the present specification may refer to an optical device that allows incident light to retardate down to ½ of the wavelength. The above-mentioned retardation layer may be a liquid crystal polymer layer that is formed by aligning and polymerizing a polymeric liquid crystal compound or a plastic film with birefringence by a stretching or shrinking process. In an example, the retardation layer may be the plastic film with the birefringence by inclination-stretching, for example, an inclination-stretched COP film, and the like.

The polarization element may be a general element that is known in the related art. For example, the polarization element may be an element manufactured through adsorption and alignment of a dichroic dye to a polyvinyl alcohol resin.

In an example, the resin layer including the above-mentioned particle may be formed on one side or both sides of the substrate. In addition, the substrate may be subjected to various surface treatments, such as a low reflection treatment, a reflection-preventing treatment, an anti-glare treatment, a high-resolution anti-glare treatment, and the like, according to necessity.

Also, the LCF may further include an alignment layer. The term, "an alignment layer" may mean a layer for giving or improving an alignment uniformity in the process of forming the CLC layer or exhibiting a surface alignment property to align the director of the liquid crystal. The alignment layer may be, for example, a resin layer for giving a plurality of patterned groove areas, a photo alignment layer, a rubbing layer, such as rubbed polyimide, and the like. The alignment layer may be formed, for example, on the surface of the substrate. Specifically, the alignment layer may be formed, for example, on the surface on which the CLC layer is formed on the substrate. In some cases, a specific alignment layer is not formed, but a way for giving an alignment property to the substrate may also be used by simply rubbing or stretching the substrate or giving a hydrophilic property to the surface.

When the LCF includes the substrate and the CLC layer is formed on one side of the substrate, the alignment layer may be disposed between the substrate and the CLC layer. However, for example, when the substrate has a wetting angle of the above range, the substrate may have the property for controlling the location of helical axis of the CLC area or CLC alignment within a desired range even without the alignment layer.

Also, the present invention relates to a method of manufacturing the LCF. The method may include forming a CLC layer that is a single layer and that includes at least two types of CLC areas, of which center wavelengths of reflected light are different from each other, and also controlling a haze value of the LCF to be at least 5%.

In an example, the forming of the CLC layer may include coating a CLC composition including a chiral agent and a polymeric liquid crystal compound, and polymerizing the liquid crystal compound.

The term, "CLC composition" may include all kinds of compositions that can be used to form the CLC layer including the liquid crystal area in a desired pattern. In an example, the composition may include a CLC compound, a CLC polymer, or a low molecular weight compound, such as, a reactive monomer, oligomer, and the like, for form the CLC polymer. In addition, the CLC composition may include at least one additional agent, for example, a crosslinking agent, a polymerization initiator, and the like. The polymerization initiator may be included in the CLC composition in order to initiate the polymerization or crosslinking of the monomer or other low molecular weight compounds. A proper polymerization initiator may include things that can generate free radicals in order to initiate and propagate the polymerization or crosslinking. A free radical initiator may be selected, for example, according to stability or a half-life. Preferably, the free radical initiator does not generate an additional color to the CLC layer through absorption or otherwise. The free radical initiator is typically a thermal free radical initiator or a photoinitiator. The thermal free radical initiator includes, for example, a peroxide, persulfate, or azonitrile compound. The free radical initiator produces free radicals when performing a thermal degradation.

The photoinitiator may be activated by electromagnetic radiation or particle irradiation. Examples of proper photoinitiators may include an onium salt photoinitiator, an organic metal photoinitiator, a cationic metal salt photoinitiator, photodegradable organic silane, potential sulfonate, phosphine oxide, cyclohexyl phenylketone, amine substituted acetophenone, and benzophenone. Generally, different light sources may be used, but UV irradiation may be used in order to activate the photoinitiator. The photoinitiator may be selected based on the absorption of a specific wavelength of light.

The CLC composition may be a part of a coating composition typically including at least one solvent. The coating composition may include, for example, a dispersing agent, an antioxidant, and an antiozonant. Additionally, the coating composition may include various dyes and pigments in order to absorb ultraviolet rays, infrared rays, or visible rays, as required. In several cases, a viscosity modifier, such as a thickener and filler, may be properly added.

The CLC composition may be applied on the substrate by all kinds of liquid-coating methods. In some embodiments, after coating, the CLC composition is polymerized, or converted to a CLC layer. The conversion may be achieved by evaporating the solvent and heating to align the CLC material; crosslinking the CLC composition; or, for example, supplying heat such as actinic irradiation; irradiating light, such as ultraviolet rays, visible rays, or infrared rays, and irradiating electron beams, or combinations thereof, or various techniques including curing of the CLC composition used with similar techniques.

In an example, the CLC composition may include a compound of Chemical Formula 1, a photoinitiator, and a chiral agent.

The photoinitiator initiates polymerization or crosslinking of the compound of Chemical Formula 1, and can be used by properly selecting a general component that is known in the related art as long as it has no compatibility problems with the compound. The photoinitiator may include, for example, at least one or two selected from the group consisting of 2-methyl-1-[4-(methylthio)phenyl]-2-(4-morpholinyl)-1-propanone, 2-dimethoxy-1,2-diphenylethan-1-one, 1-hydroxycyclohexyl-phenyl-ketone, triaryl sulfonium hexafluoroantimonate salts, diphenyl(2,4,6-trimethylbenzoyl)-phosphine oxide, and the like, but is not limited thereto. The CLC composition may include the photoinitiator in a ratio of 0.1 parts by weight to 10 parts by weight based on 100 parts by weight of the compound of Chemical Formula 1. The polymerization and crosslinking of the liquid crystal can be effectively induced and decrease of the physical properties due to the remaining initiator after the polymerization and crosslinking can be prevented by controlling the content of the initiator as mentioned. For the present specification, the unit parts by weight may refer to the ratio of weight unless the definition is specifically indicated otherwise.

The above-mentioned kinds of compounds may be used as the chiral agent. The CLC composition may include the chiral agent in a ratio of 1 part by weight to 10 parts by weight based on 100 parts by weight of the compound of Chemical Formula 1. The chiral agent may effectively induce a helical twist of the CLC when its content is controlled as indicated above.

The CLC composition may further include a solvent according to necessity. The solvent may include, for example, halogenated hydrocarbons, such as chloroform, dichloromethane, tetrachloroethane, trichloroethylene, tetrachloroethylene, chlorobenzene, and the like; aromatic hydrocarbons, such as benzene, toluene, xylene, methoxy benzene, 1,2-dimethoxybenzene, and the like; alcohols, such as methanol, ethanol, propanol, isopropanol, and the like; ketones, such as acetone, methylethylketone, methylisobutylketone, cyclohexanone, cyclopentanone, and the like; cellosolves, such as methylcellosolve, ethylcellosolve, butylcellosolve, and the like; ethers, such as diethylglycol dimethylether (DEGDME), dipropyleneglycol dimethylether (DPGDME), and the like; etc. In addition, the content of the solvent is not particularly limited, and may be properly selected in consideration of coating efficiency, drying efficiency, and the like.

In addition, the CLC composition may further include a surfactant. The surfactant is distributed on the surface of the liquid crystal to allow the surface to be even, and also enable the alignment of liquid crystal to stabilize, thereby maintaining a smooth surface of the film after forming the CLC layer so that it can improve the quality of the appearance.

The surfactant may include, for example, a fluorocarbon-based surfactant and/or silicon-based surfactant. The fluorocarbon-based surfactant may include Fluorad FC4430™, Fluorad FC4432™, and Fluorad FC4434™ that are available from 3M, Zonyl available from DuPont, and the like, and the silicon-based surfactant may include BYK™ available from BYK-Chemie, and the like. The content of the surfactant is not particularly limited, but may be properly selected in consideration of coating efficiency, drying efficiency, and the like.

After coating the above-mentioned CLC composition, the components of the composition may be polymerized to form the CLC layer while the CLC alignment of the liquid crystal compound is induced in the composition.

In an example, the forming of the CLC layer may include forming a concentration gradient of the chiral agent through irradiating relatively weak ultraviolet ray to the coating layer of the CLC composition and then irradiating relatively strong ultraviolet ray to the coating layer with the concentration gradient to polymerize the components of the composition. The CLC layer that is the single layer and that including at least two types of the CLC areas that have different center wavelengths of the reflected light from each other may be effectively formed according to the above method.

When relatively low levels of ultraviolet ray are irradiated to the coating layer of the CLC composition at a predetermined temperature, the concentration gradient of the chiral agent may be induced in the coating layer, that is, the change of the concentration of the chiral agent may be induced along the predetermined direction in the coating layer. In an example, the concentration gradient of the chiral agent may be formed along the thickness direction of the coating layer. The irradiation of ultraviolet ray to form the concentration gradient of the chiral agent may be performed within a range of temperature, for example, 40° C. to 80° C., 50° C. to 70° C., or about 60° C. In addition, the irradiation of ultraviolet ray for the formation of the concentration gradient may be performed by irradiating the ultraviolet ray having a wavelength of UV A at an intensity of radiation of about 10 mJ/cm$^2$ to 500 mJ/cm$^2$.

After forming the concentration gradient as mentioned above, sufficient ultraviolet ray to polymerize the components of the composition may be irradiated to form the CLC layer. According to the irradiation of ultraviolet ray, the liquid crystal may be fixed to have a different pitch according to the concentration gradient of the chiral agent that is formed so that the CLC area may be formed. A condition of the strong ultraviolet ray is not particularly limited as long as the polymerization of the components of the composition is sufficiently performed. In an example, the irradiation of the ultraviolet rays may be performed by irradiating the ultraviolet ray having a wavelength of UV A to C at an intensity of radiation of about 1 J/cm$^2$ to 10 J/cm$^2$.

In an example, the coating layer of the CLC composition may be formed on a proper substrate. The substrate may be, for example, an optically isotropic substrate, an optically anisotropic substrate, a polarization element, and the like, as mentioned above.

In an example, an alignment property may be given on the side of substrate having the coating layer of the CLC composition. The alignment property may be given by using the substrate with the hydrophilic surface as mentioned above, rubbing or stretching the substrate, or forming an alignment layer on the surface of the substrate. An effect on forming the wideband CLC layer can be increased by giving a proper alignment property on the side of the substrate. A method of forming the alignment layer on the substrate is not particularly limited, and a proper method known in the related art may be used.

The method of manufacturing the LCF may include controlling a haze value of the film to be at least 5%.

The controlling of the haze value may be performed, for example, by forming the homeotropic- or focal conic-aligned CLC area in the CLC layer when forming the CLC layer, or forming a haze layer on one side or both sides of the CLC layer.

A method of forming the homeotropic- or focal conic-aligned CLC area is not particularly limited. For example, after the coating layer of the CLC composition is formed on the hydrophilic surface of the substrate having the wetting angle of the above-mentioned range, the CLC layer may be formed by the above-mentioned method or a proper additional agent that can control the alignment of the liquid crystal may be added to the CLC composition.

Thus, in an example, the coating layer of the CLC composition may be formed on the surface of the substrate having a wetting angle of 0° to 50°, 0° to 40°, 0° to 30°, 0° to 20°, or 0° to 10°. The substrate having the wetting angle indicated above may be a substrate having a surface that is properly hydrophilic-treated, or a substrate having an innate hydrophilic property because it includes a hydrophilic functional group. The hydrophilic treatment may include, for example, a corona treatment, a plasma treatment, an alkaline treatment, and the like. The treating conditions are not particularly limited. Various methods of giving the hydrophilic property to the substrate are known in the related art, and the hydrophilic treatment may be performed to allow the substrate to exhibit the wetting angle through the various methods mentioned above.

The controlling of the haze value in the film can be performed by forming the haze layer on one side or both sides of the CLC layer in addition to the method of controlling the helical axis of the CLC area in the CLC layer. A method of forming the haze layer is not particularly limited. For example, the resin layer may be manufactured by forming the resin layer on one side or both sides of the liquid crystal layer, in which the resin layer is formed by curing a coating layer that includes a curable composition that is at least one selected from the group consisting of a room temperature curable composition, a moisture curable composition, a heat curable composition, an active energy ray curable composition, or a hybrid curable composition; and a particle. Specifically, a coating solution is prepared by mixing the room temperature curable composition, the moisture curable composition, the heat curable composition, the active energy ray curable composition, or the hybrid curable composition; and the particle having a different refractive index from the resin layer that is formed by curing the compositions, and then the coating solution is coated and then cured. The coating and curing of the coating solution may be performed directly on the surface of the CLC layer, on one side of the substrate having the CLC layer, or on any other substrates. When the haze layer is formed on any other substrate, the haze layer may be formed by adhering the substrate to the CLC layer, or by transferring the haze layer that is formed on the substrate to the CLC layer, or another substrate of the LCF to form the haze layer.

The present invention relates to an optical device. The optical device may include the LCF and a λ/4 wavelength layer arranged on at least one side of the LCF. In an example, the optical device may be used as a reflective polarization plate.

A polymer film or a LCF may be used as the λ/4 wavelength layer, for example, and may have a single layer or multi layer structure. The polymer film may include a film including polyolefin, such as polycarbonate (PC), norbornene resin, poly(vinyl alcohol) (PVA), polystyrene (PS), poly(methyl methacrylate) (PMMA), polypropylene (PP), and the like, poly(arylate) (PAR), polyamide (PA), poly(ethylene terephthalate) (PET), polysulfone (PS), and the like. The polymer film may be used as the λ/4 wavelength layer through giving birefringence by stretching or shrinking under proper conditions.

The λ/4 wavelength layer may be a liquid crystal layer. In an example, the liquid crystal layer that is the λ/4 wavelength layer is formed on the surface of the substrate. In addition, an alignment layer may be present between the substrate and the liquid crystal layer.

The alignment layer or substrate of the liquid crystal layer that is the λ/4 wavelength layer or a type of the liquid crystal to form the λ/4 wavelength layer is not particularly limited. In an example, the substrate of the above-mentioned CLC layer, for example, an optically isotropic substrate, and the like, may be used as the substrate. The known alignment layer, such as an optical alignment layer, a rubbing alignment layer, and the like, may be used as the alignment layer. In addition, considering a lower alignment layer, a desired phase difference property, and the like, a proper material may be used as the liquid crystal, and for example, Reactive Mesogen (RM) available from Merck, LC242 available from BASF, and the like may be exemplified.

The liquid crystal layer that is the λ/4 wavelength layer may be formed by (a) forming an alignment layer on a substrate; (b) coating and aligning a polymeric liquid crystal compound on the alignment layer; and (c) polymerizing the aligned liquid crystal compound.

The optical device may be implemented in various structures. FIG. 5 to FIG. 12 illustrate exemplified structures of the polarization plate.

In an example, the optical device 5 may include a first substrate 54, a λ/4 wavelength layer 53 that is formed on one side of the first substrate 54, the CLC layer 52 adhered to the λ/4 wavelength layer 53, and a second substrate 51, as shown in FIG. 5. In the structure of FIG. 5, the λ/4 wavelength layer 53 may be the liquid crystal layer and the λ/4 wavelength layer 53 may be formed in a state adhered to the CLC layer 52. The first substrate 54 or the second substrate 51 may be equally applied as mentioned above. In the structure of FIG. 5, the homeotropic- or focal conic-aligned CLC area mentioned above may be present in the CLC layer 52, or the above-mentioned haze layer may be formed on one side of the first substrate 54 or the second substrate 51 so that the haze of the overall film can be controlled.

In FIG. 6, an exemplified optical device 6 has a structure in which the λ/4 wavelength layer 53 and the CLC layer 52 are formed on both sides of one substrate 61. The same substrate as the substrate on which the CLC layer or the λ/4 wavelength layer is formed may be used as the substrate 61. In the structure of FIG. 6, the homeotropic- or focal conic-aligned CLC area mentioned above may be present in the CLC layer 52, or the above-mentioned haze layer may be formed on one side of the λ/4 wavelength layer 53 or the CLC layer 52 so that the haze of the overall film can be controlled.

In FIG. 7, an exemplary optical device 7 has a structure in which the CLC layer 52 and the λ/4 wavelength layer 53 are formed on one substrate 71 in order. The same substrate as the substrate on which the CLC layer or the λ/4 wavelength layer is formed may be used as the substrate 71. In the structure of FIG. 7, the homeotropic- or focal conic-aligned CLC area mentioned above may be present in the CLC layer 52, or the above-mentioned haze layer may be formed on one side of the λ/4 wavelength layer 53 or the substrate 71 so that the haze of the overall film can be controlled.

In FIG. 8, an exemplified optical device 8 has a structure in which the λ/4 wavelength layer 53 and the CLC layer 52 are formed on one substrate 81 in order. The same substrate as the substrate on which the CLC layer or the λ/4 wavelength layer is formed may be used as the substrate 81. In the structure of FIG. 8, the homeotropic- or focal conic-aligned CLC area mentioned above may be present in the CLC layer 52, or the above-mentioned haze layer may be formed on the CLC layer 52 or the substrate 81 so that the haze of the overall film can be controlled.

The exemplified optical devices shown in FIG. 5 to FIG. 8 may be integrated with the polarization element to form the optical devices. Generally, a polarization plate used for an LCD and the like includes a polarization element, such as a PVA-based polarization element, and also a protection film that is formed on one side or both sides of the polarization element.

In an example, for the structures of the exemplified optical devices shown in FIG. 5 to FIG. 8, an integral optical device can be implemented by adhering a protection film of the polarization plate to the optical device or using the protection film of the polarization plate as the substrate. When constituting the integral element, the polarization element may be constituted to be arranged on the upper side of the λ/4 wavelength layer. FIG. 9 to FIG. 12 show integral optical devices using the structures of the optical devices corresponding to FIG. 5 to FIG. 8, respectively. Each case includes a polarization element 91, such as a PVA-based polarization element, and the like.

The optical device may include a wideband CLC layer and also exhibit a haze value within a proper range so that it can satisfy the following Formula 4 or 5. In an example, the optical device may be satisfy both of the following Formula 4 and Formula 5:

$$|X1-X2| \leq 0.1 \quad \text{[Formula 4]}$$

$$|Y1-Y2| \leq 0.1 \quad \text{[Formula 5]}$$

where, X2 and Y2 are an x value and a y value in a tristimulus value of CIE color space of light penetrated through the optical device by irradiating to one side of the optical device, respectively; and X1 and Y1 are an x value and a y value in the tristimulus value of the CIE color space before light irradiated to the optical device is penetrated through the polarization plate.

In an example, the light irradiated to one side of the optical device is irradiated to the LCF of the optical device so that it can be irradiated to penetrate through the LCF and the λ/4 wavelength layer in order.

The absolute value of the difference between X1 and X2 that are calculated from Formula 4 or the absolute value of the difference between Y1 and Y2 that are calculated from Formula 5 is maintained to be 0.1 or less, respectively, so that for example, when the optical device is applied to an LCD and the like, the loss of luminance is minimized and also a color coordinate of the light source is effectively reproduced, thereby implementing an excellent image.

The absolute value of the difference between X1 and X2 of Formula 4 may be 0.08 or less, 0.06 or less, 0.04 or less, 0.02 or less, or 0.01 or less in other examples.

In addition, the absolute value of the difference between Y1 and Y2 of Formula 5 may be 0.08 or less, 0.06 or less, 0.04 or less, 0.02 or less, or 0.01 or less in other examples.

When the absolute value of the difference between X1 and X2 and the absolute value of the difference between Y1 and Y2 are low, the property of a light source of the optical device can be effectively reproduced. Thus, the lowest limits of the values are not particularly limited.

Also, the present invention relates to an LCD. An exemplified LCD may include the optical device.

In an example, the LCD may further include a liquid crystal panel, and a light source arranged on one side of the liquid crystal panel, and the optical device may be arranged between the liquid crystal panel and the light source. In addition, for the optical device, the LCF may be arranged so that the light source is located closer than the λ/4 wavelength layer.

As exemplified in FIG. 13, an LCD 13 may include, for example, a liquid crystal panel 132, of which polarization plates 131, 133 are arranged on both upper and lower sides; and a light source 135 that is arranged at the lower side of the lower polarization plate 133, and the optical device 134 may be arranged between the lower polarization plate 133 and the light source 135.

The optical device 134 may include a CLC layer 1342 and a λ/4 wavelength layer 1341, and the CLC layer 1342 may be arranged so that the light source 135 is located closer than the λ/4 wavelength layer 1341.

In the above structure, the CLC layer 1342 of the optical device 134 may allow partial light emitted from the light source 135 to penetrate to supply the light to the lower polarization plate 133 and to reflect the rest of the light to the light source 135. The light supplied to the lower polarization plate 133 may be converted to a linear polarization by the λ/4 wavelength layer 1341 to be delivered to the upper side. In that case, the light reflected by the CLC layer 1342 may be re-reflected in a device and the polarization property may be changed to be again incident to the polarization plate 134. Through a repetition of the above process, a luminance property of the device can be improved.

As mentioned in an example, when the optical device is implemented as an integral structure with the polarization element, instead of the polarization plate 133 and the optical device 134, the optical device with the integral structure may be located at the area that has the polarization plate 133 and the optical device 134 in FIG. 13.

Even in that case, the element may be arranged so that the light emitted from the light source 135 is first incident to the CLC layer in the optical device with the integral structure, part of the light is reflected and the rest of the light is penetrated, and the penetrated light penetrate the λ/4 wavelength layer and the polarization element in the element in order to be incident to the liquid crystal panel 132.

Other parts, structures, and the like are not particularly limited as long as the LCD includes the optical device, and all the contents that are known in the related art may be properly applied.

The exemplified LCF according to the present invention may be used as a reflective polarization plate that can improve luminance and light utilization efficiency of a display device, such as an LCD, and the like. The exemplified LCF can provide a display device with an excellent image quality because it allows the color of light to be effectively reproduced while also allowing the loss of luminance to be minimized.

DETAILED DESCRIPTION OF EXEMPLARY EMBODIMENTS

Hereinafter, the LCF will be described in further detail with reference to Example and Comparative Example, but the range of the LCF is not limited to the following Example.

Preparation Example 1

Preparation of CLC Composition (A)

A CLC composition was prepared by dissolving RMM856, which is a CLC mixture available from Merck, in a mixed solvent of toluene and cyclohexanone (weight ratio=7:3 (toluene:cyclohexanone)) to be about 40 wt % of solid; heating at 60° C. for 1 hour in order to prepare a homogenous solution; and then sufficiently cooling.

Example 1

Manufacturing of LCF

A substrate layer with a hydrophilic surface was manufactured by performing a corona treatment for 5 seconds under the conditions of 300 Watt on one side of a PET (MRL38, available from Mitsubishi) substrate. A wetting angle of the PET substrate to water was about 60°, and a wetting angle of the hydrophilic surface to water was controlled to be about 30° to 40° through irradiation of ultraviolet rays. Then, a CLC composition (A) was coated on the hydrophilic surface of the substrate layer with a wire bar, and then dried at 100° C. for 2 minutes to manufacture a liquid crystal layer with a thickness of about 5 μm. Then, a concentration gradient of a chiral agent was induced by irradiating ultraviolet rays within a wavelength range of 350 nm to 400 nm using an ultraviolet ray irradiating apparatus (TLK40W/10R available from Philips) to the coating layer that was dried at a temperature of about 60° C. (intensity of irradiation: about 100 mJ/cm$^2$). After inducing the concentration gradient, the ultraviolet rays were again irradiated using the ultraviolet ray irradiating apparatus (Fusion UV, 400 W) in order to sufficiently cure the composition to polymerize the coating layer and manufacture a CLC layer, thus manufacturing an LCF. A haze value of the LCF manufactured by the above process was measured with a hazemeter (HR-100) available from Sepung, and as a result, a haze value was about 10%.

Manufacture of Reflective Polarization Plate

The CLC layer of the LCF manufactured by the above processes was in contant with a λ/4 wavelength layer to manufacture a reflective polarization plate. A λ/4 wavelength layer that has an alignment layer and a liquid crystal layer on one side of a TAC substrate in order was used as the λ/4 wavelength layer, and the liquid crystal layer of the λ/4 wavelength layer was in contact with the CLC layer with an adhesive to manufacture the reflective polarization plate.

Comparative Example 1

An LCF and a reflective polarization plate were manufactured using the same method as in Example 1, except that a PET substrate on which a corona treatment was not performed was used. A haze value of the LCF manufactured by the above process was measured with a hazemeter (HR-100) available from Sepung, and as a result, a haze value was about 2%.

Experiment Example 1

Measurement of Transmittance According to Wavelength

Figure 1:
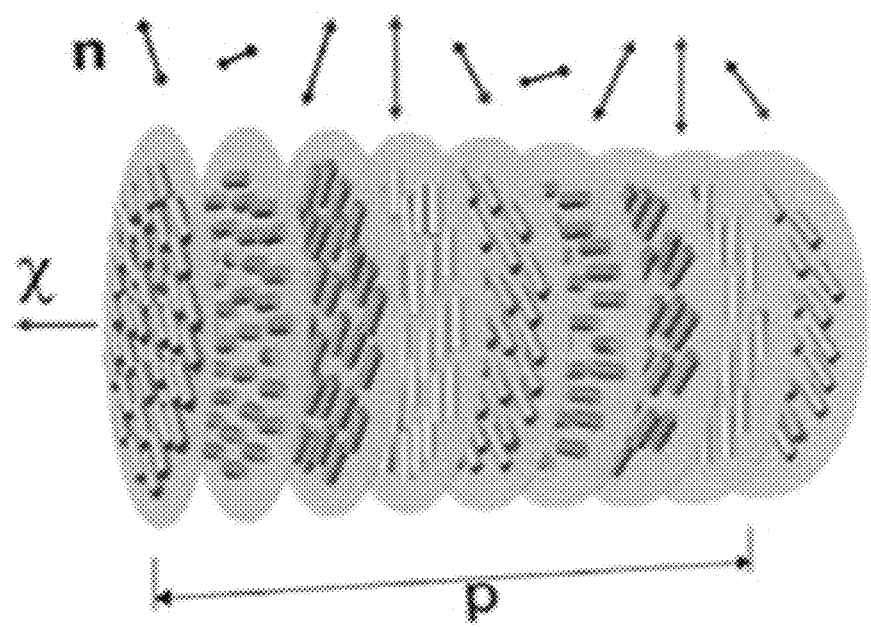
FIG. 1 is an exemplified diagram for illustrating a CLC.
Figure 2:
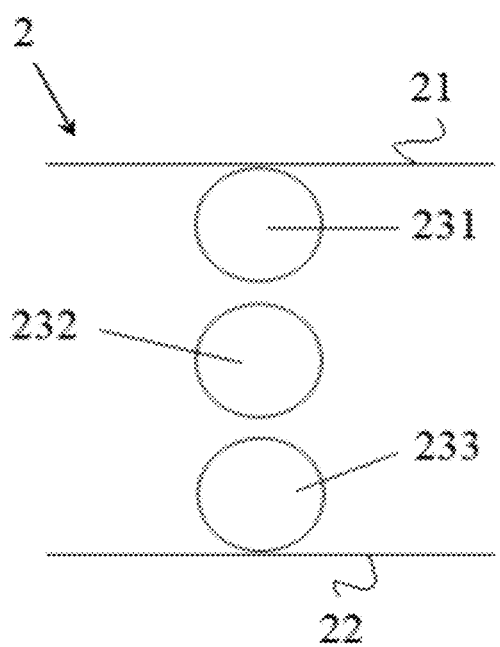
FIG. 2 is a diagram showing an arrangement of a CLC area in the CLC layer by way of example.
Figure 3:
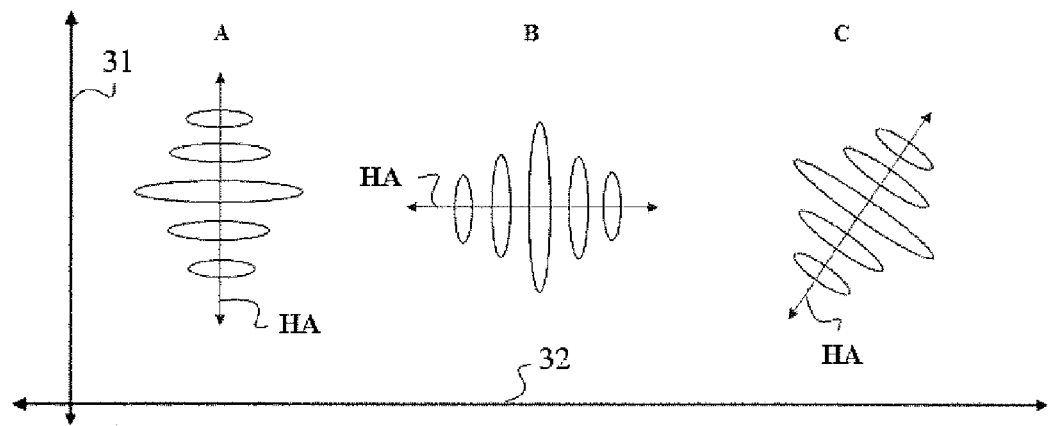
FIG. 3 is an exemplified diagram for illustrating an alignment of a CLC.
Figure 4:
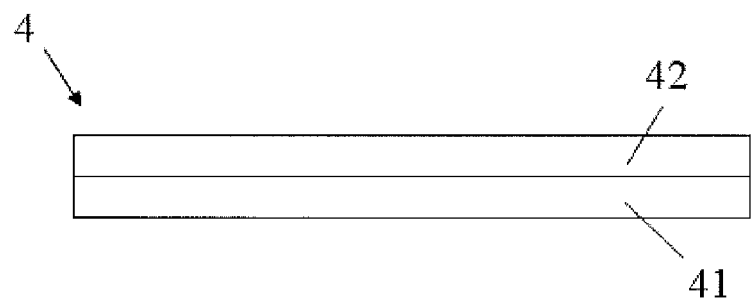
FIG. 4 is a diagram showing an exemplified LCF.
Figure 5:
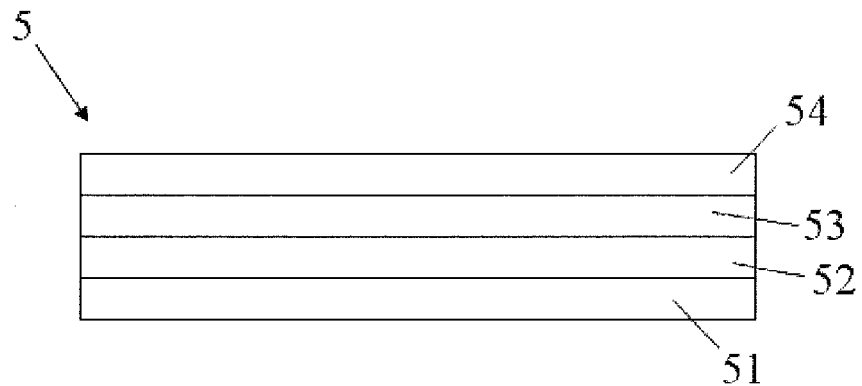
FIG. 5 to FIG. 12 are diagrams showing an exemplified optical device.
Figure 6:
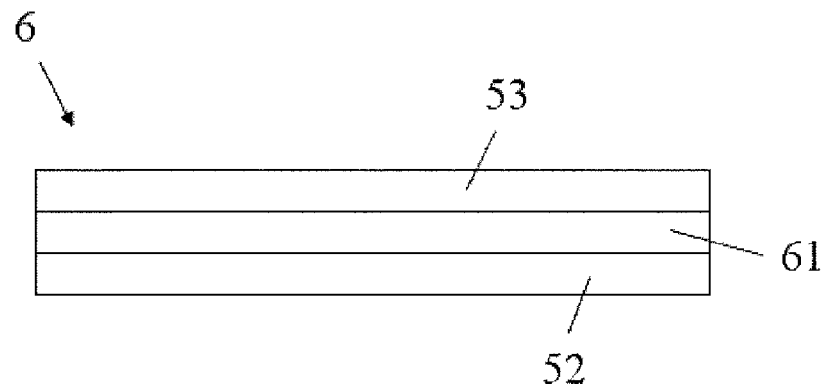
Figure 7:
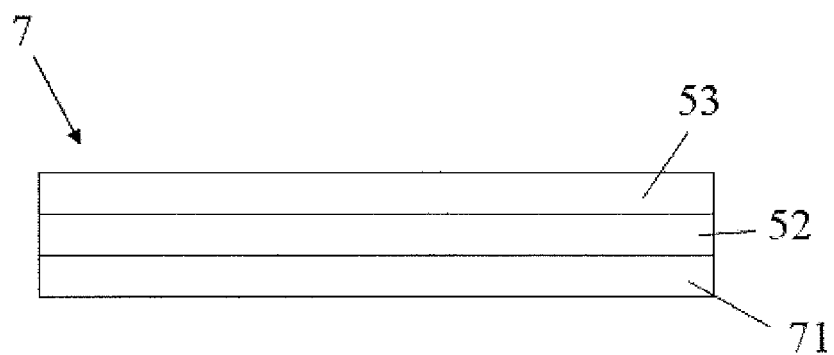
Figure 8:
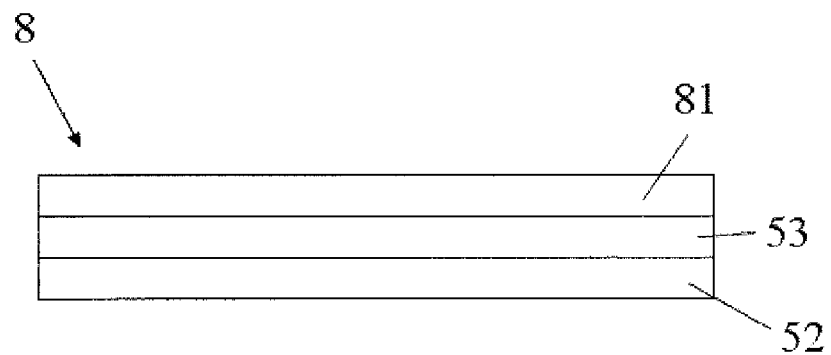
Figure 9:
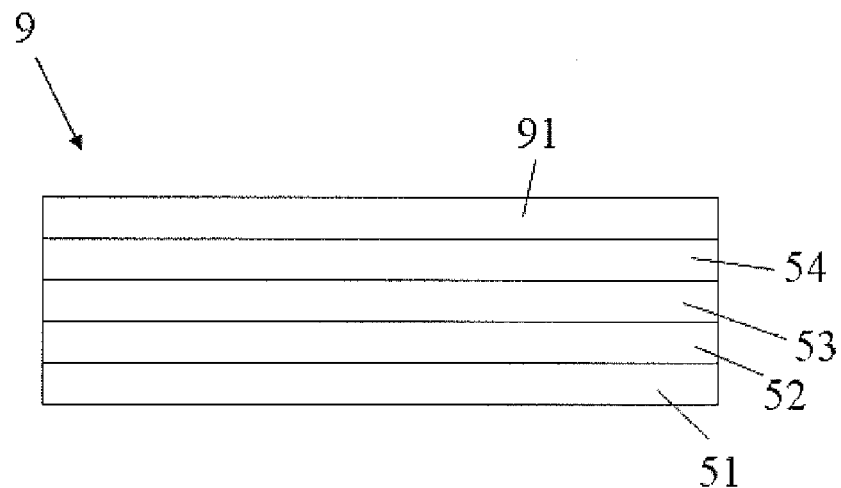
Figure 10:
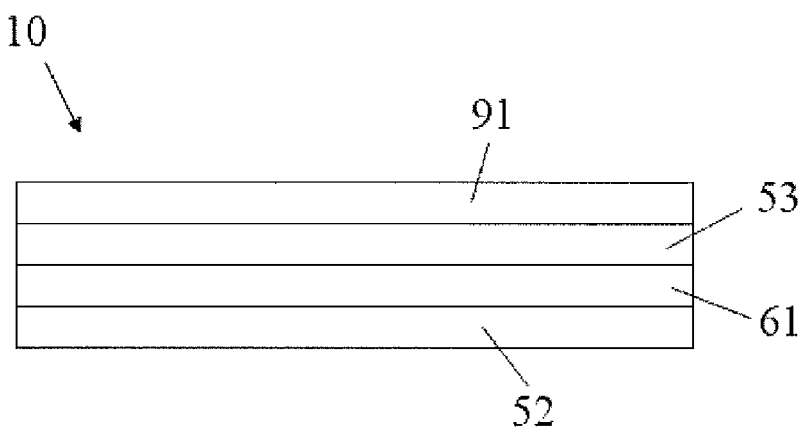
Figure 11:
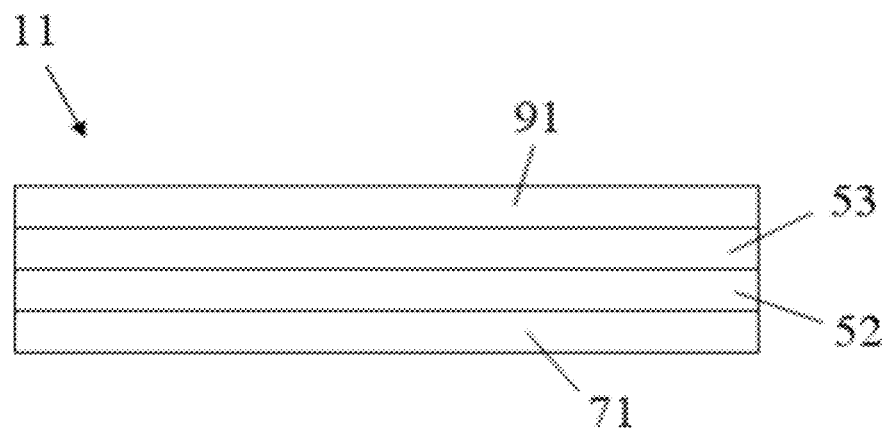
Figure 12:
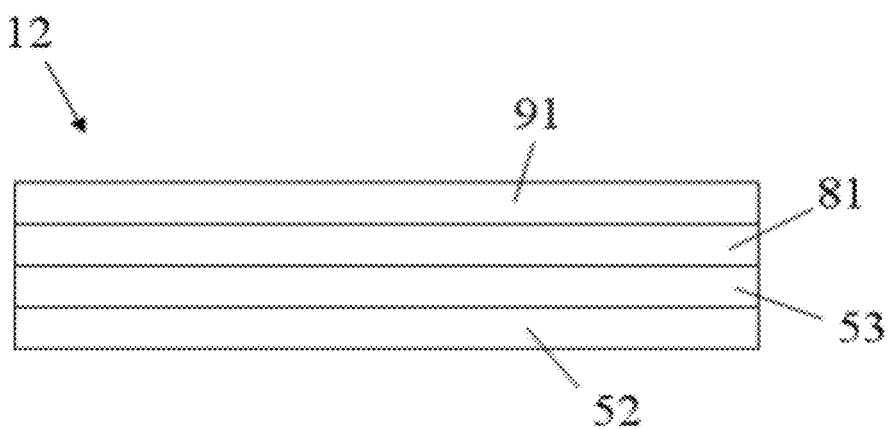
Figure 13:
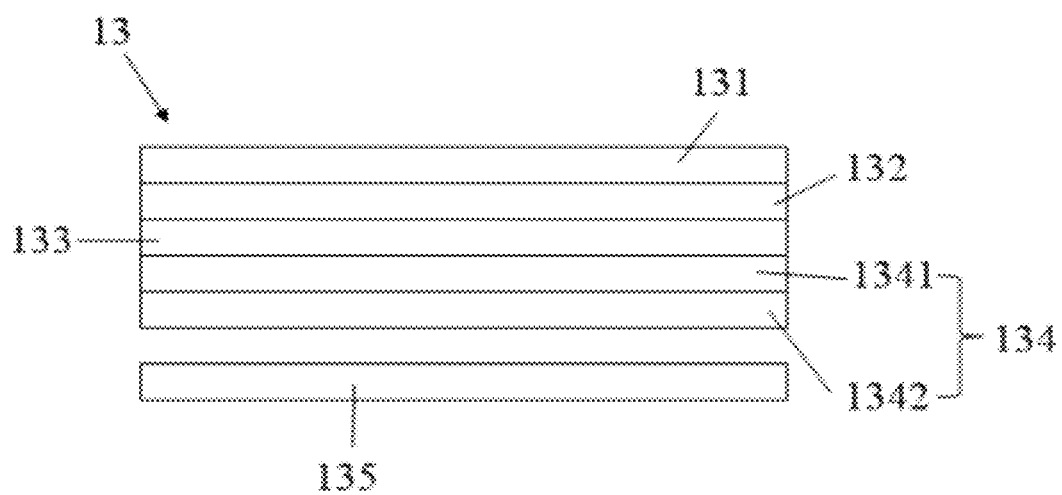
FIG. 13 is a diagram showing an exemplified LCD.
Figure 14:
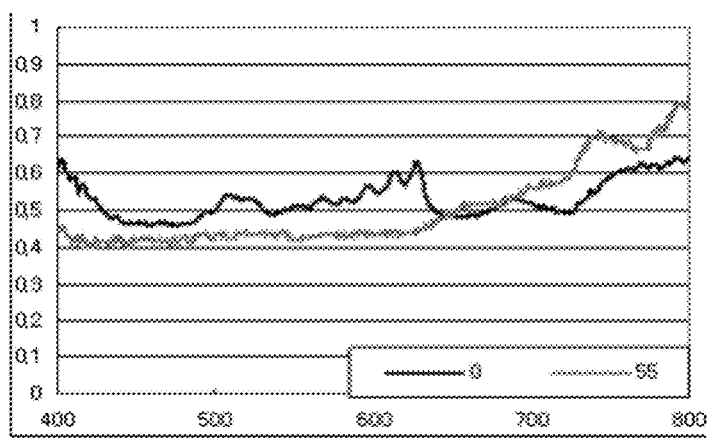
FIG. 14 and FIG. 15 are diagrams showing results of measuring transmittances in Example and Comparative Example.
Figure 15:
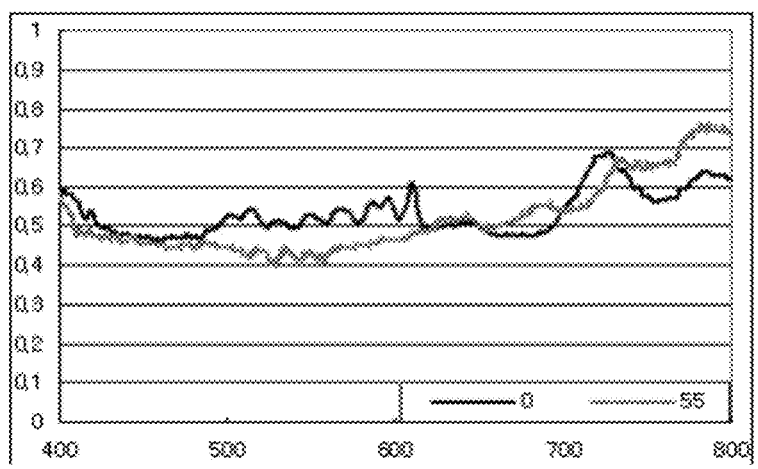

Wideband reflecting properties of the LCFs manufactured from Example 1 and Comparative Example 1 were confirmed using an Axo Scan apparatus available from Axo Metrics, and the results thereof are shown in FIG. 14 and FIG. 15, respectively. FIG. 14 shows the result of Example 1 and FIG. 15 shows the result of Comparative Example 1, and an x axis of each figure is a wavelength, and a y axis of each figure is a transmittance. In addition, lines marked with "0" in FIG. 14 and FIG. 15 are the results measured from the front and lines marked with "55" are the results measured from a 55° angle of inclination. From the results of FIG. 14 and FIG. 15, it can be confirmed that a stable wideband property was shown at the front and angle of inclination in Example.

Experiment Example 2

Measurement of x and y Properties of CIE

While a light source was irradiated to the CLC layer of the manufactured reflective polarization plate, x and y values of CIE of the light emitted through the CLC layer were measured using the manufacturer's manual with an EZ Contrast apparatus available from Eldim, and are shown in the following Table 1:

TABLE 1

| | CIE Coordinates | | | |
| | Light Source | | After Penetration | |
| | x | y | X | y |
| Example 1 | 0.261 | 0.265 | 0.261 | 0.268 |
| Ref. | 0.261 | 0.265 | 0.265 | 0.269 |

Ref.: Value to Dual Brightness Enhancement Film on market

| Explanation of Marks |
|---|
| n: CLC Director |
| P: Pitch |
| X: Helical Axis |
| 2: CLC Layer    21, 22: Main Surface of CLC Layer |
| 231, 232, 233: CLC Area |
| HA: Helical Axis of CLC Area |
| 31: Thickness Direction of CLC Layer |
| 32: Perpendicular Direction to Thickness Direction of CLC Layer |
| 4: LCF |
| 41, 51, 54, 61, 71, 81: Substrate    41: CLC Layer |
| 5, 6, 7, 8, 9, 10, 11, 12: Reflective Polarization Plate |
| 52, 1342: CLC Layer |
| 53, 1341: λ/4 Wavelength Layer    91: Polarization Element |
| 13: LCD |
| 131, 133: Polarization Plate    132: Liquid Crystal Panel |
| 134: Reflective Polarization Plate |
| 135: Light Source |

What is claimed is:

1. A liquid crystal display device comprising an optical device, a liquid crystal panel, and a light source arranged on one side of the liquid crystal panel, wherein the optical device is arranged between the liquid crystal panel and the light source, wherein the optical device satisfies the following Formula 4 or Formula 5, and the optical device comprises:

a liquid crystal film comprising a substrate and a liquid crystal layer formed on at least one side of the substrate, wherein the side of the substrate on which the liquid crystal layer is formed has a wetting angle of 30° to 50°, wherein the liquid crystal layer is a single layer and comprises at least two types of cholesteric-aligned liquid crystal areas, of which center wavelengths of reflected light are different from each other, and has a haze value of 15% to 30%, wherein the at least two types of cholesteric-aligned liquid crystal areas comprise a first liquid crystal area on which a helical axis of a director of a cholesteric liquid crystal molecule is formed parallel to a thickness direction of the liquid crystal layer, and a second liquid crystal area on which the helical axis of the director of the cholesteric liquid crystal molecules formed is formed not parallel to a thickness direction of the liquid crystal layer, and a λ/4 wavelength layer formed on one side or both sides of the liquid crystal film:

$$|X1-X2| \leq 0.1 \quad \text{[Formula 4]}$$

$$|Y1-Y2| \leq 0.1 \quad \text{[Formula 5]}$$

where, X2 and Y2 are an x value and a y value in a tristimulus value of CIE color space of light penetrated through the by irradiating to one side of the optical device, respectively; and X1 and Y1 are an x value and a y value in the tristimulus value of the CIE color space before light irradiated to the optical device penetrates through the optical device.

2. The liquid crystal display device of claim 1, wherein the liquid crystal area comprises a first area of which a center wavelength of reflected light of 400 nm to 500 nm, a second area of which a center wavelength of reflected light of 500 nm to 600 nm, and a third area of which a center wavelength of reflected light of 600 nm to 700 nm.

3. The liquid crystal display device of claim 1, wherein the liquid crystal layer comprises a compound represented by the following Chemical Formula 1 in a polymerized form:

[Chemical Formula 1]

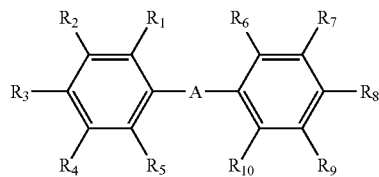

where, A is a single bond, —COO—, or —OCO—; and $R_1$ to $R_{10}$ are independently hydrogen, a halogen, an alkyl group, an alkoxy group, cyano group, a nitro group, —O-Q-P, or a substituent of the following Chemical Formula 2, respectively, with the proviso that at least one of $R_1$ to $R_{10}$ is —O-Q-P or a substituent of the following Chemical Formula 2, where Q is an alkylene group or an alkylidene group, and P is an alkenyl group, an epoxy group, a cyano group, a carboxyl group, an acryloyl group, a methacryloyl group, an acryloyloxy group, or a methacryloyloxy group

[Chemical Formula 2]

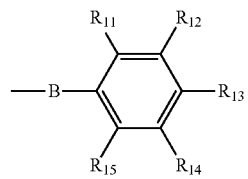

where, B is a single bond, —COO—, or —OCO—; and $R_{11}$ to $R_{15}$ are independently hydrogen, a halogen, an alkyl group, an alkoxy group, a cyano group, a nitro group, or —O-Q-P, respectively, with the proviso that at least one of $R_{11}$ to $R_{15}$ is —O-Q-P, where Q is an alkylene group or an alkylidene group, and P is an alkenyl group, an epoxy group, a cyano group, a carboxyl group, an acryloyl group, a methacryloyl group, an acryloyloxy group, or a methacryloyloxy group.

4. The liquid crystal display device of claim 1, wherein the liquid crystal film further comprises a resin layer that is formed on one side or both sides of the liquid crystal layer and that comprises a particle.

5. The liquid crystal display device of claim 4, wherein the particle has a different refractive index from the resin layer.

6. The liquid crystal display device of claim 1, wherein the substrate is an optically isotropic substrate, an optically anisotropic substrate, or a polarization element.

7. The liquid crystal display device of claim 6, wherein the optically anisotropic substrate is a λ/4 wavelength layer or a λ/2 wavelength layer.

8. The liquid crystal display device of claim 1, wherein the liquid crystal film is manufactured by a method of manufacturing a liquid crystal film, comprising: forming a liquid crystal layer that is a single layer and that comprises at least two types of cholesteric-aligned liquid crystal areas, of which center wavelengths of reflected light are different from each other; and controlling a haze value of 15% to 30% by forming the liquid crystal layer on the side of the substrate having a wetting angle of 0° to 50° so that the liquid crystal area comprises a first liquid crystal area on which a helical axis of a director of a cholesteric liquid crystal molecule is formed parallel to a thickness direction of the liquid crystal layer, and a second liquid crystal area on which the helical axis of the director of the cholesteric liquid crystal molecule is not parallel to a thickness direction of the liquid crystal layer.

9. The liquid crystal display device of claim 8, wherein the liquid crystal layer is formed by irradiating a coating layer of a cholesteric liquid crystal composition comprising a liquid crystal compound of the following Chemical Formula 1, a chiral agent, and a photoinitiator with ultraviolet ray having a wavelength of ultraviolet ray A at an intensity of 10 to 500 mJ/cm² under the temperature from 40° C. to 80° C., and then irradiating the coating layer with ultraviolet ray having a wavelength of ultraviolet ray A to C at an intensity of 1 mJ/cm² to 10 mJ/cm²:

[Chemical Formula 1]

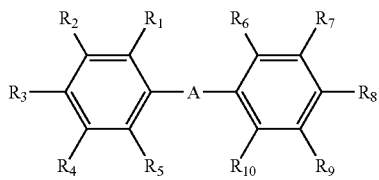

where, A is a single bond, —COO—, or —OCO—; and $R_1$ to $R_{10}$ are independently hydrogen, a halogen, an alkyl group, an alkoxy group, a cyano group, a nitro group, —O-Q-P, or a substituent of the following Chemical Formula 2, respectively, with the proviso that at least one of $R_1$ to $R_{10}$ is —O-Q-P or a substituent of the following Chemical Formula 2, where Q is an alkylene group or an alkylidene group, and P is an alkenyl group, an epoxy group, a cyano group, a carboxyl group, an acryloyl group, a methacryloyl group, an acryloyloxy group, or a methacryloyloxy group

[Chemical Formula 2]

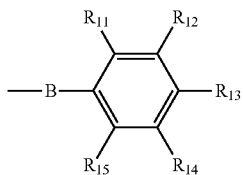

where, B is a single bond, —COO—, or —OCO—; and $R_{11}$ to $R_{15}$ are independently hydrogen, a halogen, an alkyl group, an alkoxy group, a cyano group, a nitro group, or —O-Q-P, respectively, with the proviso that at least one of $R_{11}$ to $R_{15}$ is —O-Q-P, where Q is an alkylene group or an alkylidene group, and P is an alkenyl group, an epoxy group, a cyano group, a carboxyl group, an acryloyl group, a methacryloyl group, an acryloyloxy group, or a methacryloyloxy group.

10. The liquid crystal display device of claim 8, wherein the method of manufacturing a liquid crystal film further comprises forming a resin layer on one side or both sides of the liquid crystal layer, the resin layer being formed by curing a coating layer that comprises a curable composition that is at least one selected from the group consisting of a room temperature curable composition, a moisture curable composition, a heat curable composition, an active energy ray curable composition, or a hybrid curable composition; and a particle.

11. The liquid crystal display device of claim 1, further comprising a polarization element arranged on the upper side of the λ/4 wavelength layer.

12. The liquid crystal display device of claim 1, wherein the is arranged so that the liquid crystal film is located closer to the light source than the λ/4 wavelength layer.

* * * * *